W. E. PORTER.
DEMAND INDICATOR.
APPLICATION FILED JULY 1, 1914.

1,138,786.

Patented May 11, 1915.

Witnesses:
Marcus L. Byng.
J. Ellis Glen.

Inventor,
Willard E. Porter,
by Albert L. Davis
Att'y.

UNITED STATES PATENT OFFICE.

WILLARD E. PORTER, OF LYNN, MASSACHUSETTS, ASSIGNOR TO GENERAL ELECTRIC COMPANY, A CORPORATION OF NEW YORK.

DEMAND-INDICATOR.

1,138,786.     Specification of Letters Patent.     Patented May 11, 1915.

Application filed July 1, 1914. Serial No. 848,418.

*To all whom it may concern:*

Be it known that I, WILLARD E. PORTER, a citizen of the United States, residing at Lynn, county of Essex, State of Massachusetts, have invented certain new and useful Improvements in Demand-Indicators, of which the following is a specification.

My invention relates to demand instruments or indicators, and in particular to instruments which indicate the demand and especially the maximum demand made by an electrical installation upon a central generating station or other source of electric energy supply.

Broadly, the object of my invention is to generally improve the present construction of demand indicators.

More particularly the object of my present invention is to provide a novel and improved demand indicator which is of simple and compact construction and reliable in operation.

Other and more specific objects of my present invention will be noted in detail hereinafter.

The novel and patentable features which I believe to be characteristic of my invention are indicated in the claims appended hereto.

Figure 1:
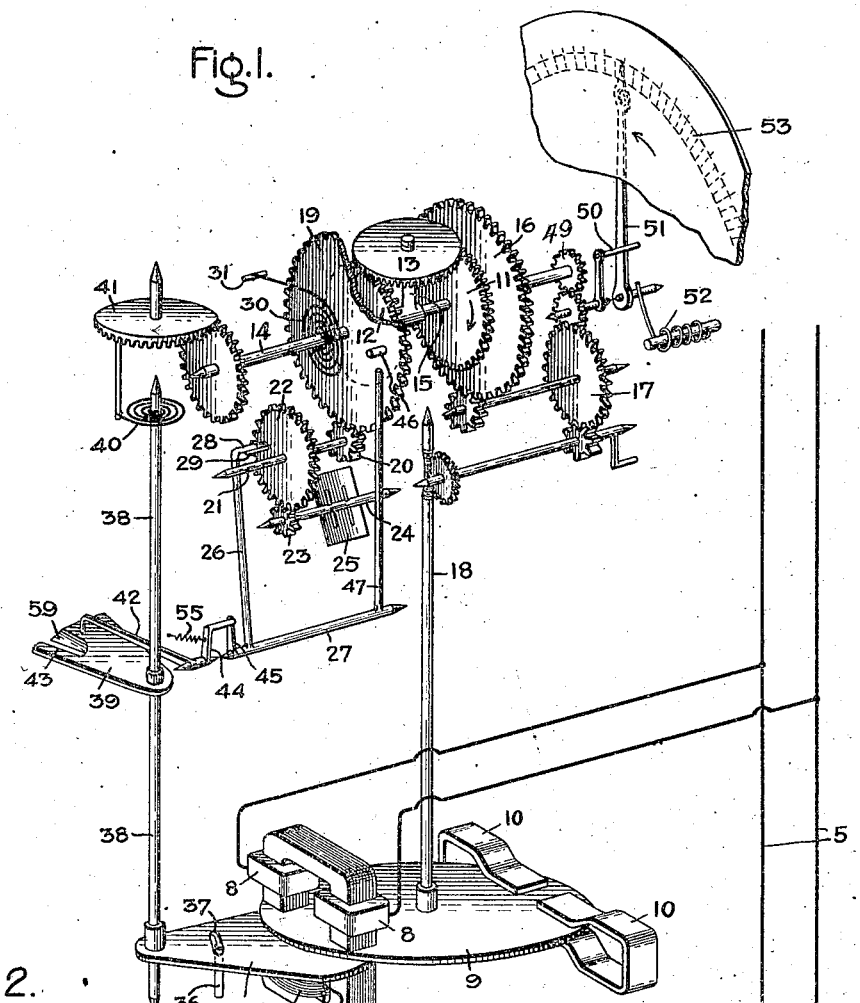
Figure 2:
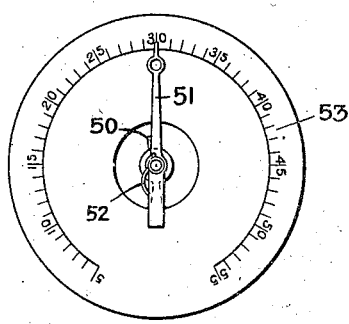

The construction and mode of operation of a maximum demand indicator embodying my invention will be understood by reference to the following description taken in connection with the accompanying drawings, in which:

Figure 1 is a diagrammatic view in perspective of my improved maximum demand indicator operatively connected to an electrical installation, and Fig. 2 is a front view of the scale and indicating member of the instrument.

The demand indicator of my present invention belongs to that general class of instruments in which measurements are intermittently made of the demand of an electrical installation and a record retained of the maximum demand so measured.

My invention relates more particularly to that type of demand indicator in which an actuator having an initial or zero position and adapted to be driven by the rotatable shaft of an electric motor meter is intermittently returned to its initial position. Any suitable recording means is employed to indicate the maximum movement of the actuator.

The novel and improved construction of my maximum demand indicator will be best understood by reference to the accompanying drawings.

Referring to Fig. 1 of the drawings, there is shown a system of distribution comprising conductors 5 supplying electric energy to translating devices 6. A watthour meter of the induction type is operatively connected to the system in the usual manner for the purpose of integrating and registering the total quantity of energy consumed in the translating devices. The watthour meter comprises the usual series coil 7 and potential coils 8 which produce a shifting magnetic field proportional to the instantaneous rate of the consumption of energy, in the well understood manner. A rotatable disk armature 9 is located within the influence of the magnetic field produced by the coils 7 and 8. Permanent magnets 10 are mounted in operative relation to the disk armature 9, so that the revolutions of the armature are directly proportional to the watthours of energy consumed in the translating devices. The speed of rotation of the disk armature 9 is proportional to and a measure of the instantaneous rate of consumption of energy in the installation.

A differential gearing comprising two gear members 11 and 12 and a planetary gear member 13 are operatively mounted upon a pivoted shaft 14. The gear members 11 and 12 are loosely mounted on this shaft, while the planetary gear member 11 is secured to the shaft by an arm 15. A gear 16 is rigidly secured to the gear member 11 and is operatively connected through a gear train 17 to the rotatable shaft 18 of the watthour meter. The gear member 11 of the differential gearing is thus directly connected to the disk armature 9 of the watthour meter and has a speed of rotation directly proportional to the speed of rotation of the disk armature.

A gear 19 is rigidly secured to the gear member 12 of the differential gearing and meshes with a pinion 20 secured to a rotatably mounted shaft 21. The shaft 21 also carries a gear 22 meshing with a pinion 23 on a shaft 24. An air damping vane 25 is also secured to the shaft 24. The gears 19, 20, 22, and 23 thus constitute a gear train of a decreasing ratio directly connecting the gear member 12 of the differential gearing to the damping vane 25.

A lever arm 26 is secured to a pivoted shaft 27 and is provided at one end with a finger 28. When the lever arm 26 is in the position indicated in Fig. 1 of the drawings, the finger 28 projects into the path of a lug 29 secured to the gear 22. The engagement of the lug 29 with the finger 28 prevents rotation of the gear 22, thereby locking the gear member 12 and preventing its rotation.

A coil spring 30 is secured at one end to the shaft 14 and at the other end to a fixed part 31 of the instrument. When energized, this spring tends to rotate the shaft 14 in a direction opposite to the direction of rotation of the gear member 11. As previously explained, rotation of the gear member 12 is normally prevented because of the engagement of the lug 29 with the finger 28, thus when the gear member 11 is rotated by the watthour meter the planetary member 13 and the shaft 14 attached thereto will rotate in a forward direction, as indicated by the arrows in Fig. 1.

The rotation of the gear member 11 operates to wind up or energize the spring 30. As previously stated, the tendency of this spring, when energized, is to drive the shaft 14 and hence the planetary gear member 13 in a backward direction. Since the gear member 12 is normally locked against rotation, the spring 30 is normally maintained inactive. It will, of course, be understood that the rotation of the shaft 14 in response to the action of the spring 30 is relatively much faster than the rotation of the gear member 11.

A sector shaped disk 35 is pivotally mounted in the same air gap as the disk armature 9 of the watthour meter. The disk 35 is thus subjected to the influence of the field produced by the coils 7 and 8. Movement of the disk 35 is restricted by means of a pin 36 which projects into a slot 37 in the disk. The disk is secured to a pivoted shaft 38, which carries a counterbalancing member 39. A control spring 40 has one end secured to the shaft 38 and the other end secured to a gear 41 adapted to be driven by the shaft 14. The spring 40 is so arranged that it is wound up or energized when the planetary member 13 rotates in a forward direction.

The remaining features of construction of my novel and improved demand indicator will be better understood by a consideration of the operation thereof. When electric energy is being supplied to the translating devices 6, a shifting magnetic field will be produced by the field coils 7 and 8, resulting as in rotation of the watthour meter armature 9, and a rotary movement of the planetary member 13 and shaft 14 in a forward direction. A torque tending to turn the sector disk 35 is also developed and results in moving the disk until one end of the slot 37 engages pin 36, as indicated in the drawings. Rotation of the shaft 14 energizes the spring 30 and also the control spring 40. The action of the control spring 40 when energized is to resist movement of the disk 35 in response to the action of the meter coils. As the control spring is gradually energized by rotation of the watt-hour meter shaft its countertorque acting on the shaft 38 will, at some instant, equal the torque resulting from the action of the meter coils. Further rotation of the watt-hour meter shaft will further energize the control spring 40, thereby increasing its countertorque to such an extent that it overcomes the torque acting on the disk 35 and moves the disk until the other end of the slot 37 engages the pin 36. When the shaft 38 is thus turned in response to the action of the spring 40, a pivoted lever 42, normally resting on the counterbalancing member 39, is pulled into a slot 43 of this member by means of a spring 55. A dog 44 is secured to the lever arm 42 and operatively engages a finger 45 secured to the pivoted shaft 27. When the lever 42 drops into the slot 43, the dog 44, through its engagement with the finger 45, operates to turn the pivoted shaft 27 and move the finger 28 from engagement with the lug 29. This movement of the lever arm 26 and finger 28 is made positive by means of the spring 55 secured between the dog 44 and a fixed part of the instrument. The gear member 12 is thus unlocked. The spring 30, being energized, now operates to turn the shaft 14 and the planetary member 13 in a backward direction. As previously stated, the rotation of the shaft 14 in response to the action of the spring 30 is relatively much faster than the rotation of the gear member 11. At this stage of the operation the gear member 11 acts, in fact, as if it were stationary or locked, and the gear member 12 therefore rotates in a backward direction due to the backward rotation of the planetary member 13 of the differential gearing. The gear member 12 tends to rotate at a rapid rate, but its rotation is retarded by the action of the decreasing gear train operatively connecting the gear member to the air damping vane 25 and by the action of the damping vane itself.

The gear 19 carries a pin 46 which rotates therewith. An arm 47 secured to the pivoted shaft 27 is arranged in the path of movement of the pin 46. When the shaft 14 and planetary member 13 rotate backwardly, due to the action of the spring 30, the pin 46, rotating counterclockwise as viewed in Fig. 1 of the drawings, engages the arm 47 and moves the lever arm 26 back into locking position, so that the finger 28 projects into the path of rotation of the lug 29. The gear member 12 is thereby locked, and rotation of the planetary member 13 in a backward direction arrested. The engagement of the pin 46 with the arm 47 and the subsequent locking of the gear member 12 determine the initial position of the planetary member 13 and of the shaft 14.

When the control spring 40 has been de-energized a slight amount its countertorque becomes smaller than the torque exerted on the sector disk by the meter coils. The sector disk thereupon responds to the action of the now dominating meter torque and moves back into the position indicated in the drawings with the pin 36 engaging the left end of the slot 37, as viewed from the front of the instrument. The slot 43 in the counterbalancing member 39 has an inclined surface 59 which forces the lever 42 out of the slot and into the position indicated in the drawings when the sector disk responds to the action of the meter torque. It will thus be seen that just as soon as the release gear train commences to run out the countertorque of the spring 40 is reduced and the sector disk 35 immediately changes sides thereby forcing the lever 42 out of the slot 43. This action occurs almost immediately after the release and before the gear train has had time to run out. It will thus be seen that the lever 42 is almost immediately returned to its initial position, as represented in the drawings, while the lever arm 26 is not returned to the position shown in the drawings until the engagement of the pin 46 with the arm 47. All of the elements of the instrument are thus returned to their respective initial positions for the beginning of another interval of demand measurement and the cycle of operations is repeated.

The shaft 14 is operatively connected at one end through gearing 49 to an actuator 50 which engages a non-return pointer 51. When the pointer and actuator are in engagement the former is moved by the latter when the planetary member 13 drives the shaft 14 in a forward direction. A spring 52 presses against the shaft carrying the pointer 51 and frictionally holds the pointer in the position to which it is moved by the actuator. The pointer sweeps across a suitable scale 53 which is graduated in any desired units to indicate the demand. The position of the pointer 51 with respect to the scale thus indicates the maximum movement of the actuator 50 in its forward direction.

The principle of operation of my novel type of demand indicator will, it is believed, be understood from the foregoing description. It will be observed that the sector shaped disk 35, pivoted shaft 38, and control spring 40 correspond to the movable element of an indicating wattmeter. The torque tending to turn the disk 35 is proportional to the instantaneous rate of consumption of energy in the installation. In an ordinary indicating instrument, the disk 35 would turn until the spring 40 had been energized a sufficient amount to develop a countertorque equal to the torque developed by the instrument coils. According to my novel arrangement, however, the movement of the disk 35 is restricted and the control spring is wound up by the watthour meter shaft until its countertorque equals a torque developed in the disk 35. It will be observed that the countertorque of the control spring must not only be equal to the torque developed in the disk 35, but slightly greater in order to move the disk to its other position and to operate the locking means normally preventing rotation of the gear member 12. It will be clear that the control spring 40 must be energized an amount substantially proportional to, and hence a measure of, the instantaneous rate of energy consumption in the installation before the actuator 50, the shaft 14 and the planetary gear member 13 are returned to their respective initial positions. The distance which the actuator 50, the shaft 14 and the planetary gear member 13 move from their initial positions before the control spring 40 is so energized is substantially proportional to and a measure of the instantaneous rate of the consumption of energy in the installation. It will thus be evident that the actuator 50 is returned to its initial position whenever the distance it is moved from such position is substantially a measure of the instantaneous rate of energy consumption in the translating devices 6 and hence of the speed of rotation of the meter shaft.

There are two conditions under which the sector disk 35 operates to effect the return of the elements of the indicator to their respective initial positions. With a substantially steady load the countertorque exerted upon the shaft 38 by the control spring 40 will continually increase in magnitude until it equals and then overcomes the torque exerted upon the sector disk by the meter coils, whereby the release of the actuator-return mechanism is effected. Again, the spring 40 may be energized to a certain extent and the consumption of energy may then fall to a value where the meter torque is smaller than the torque of the spring, thus effecting the release. In the latter case the instantaneous value of the energy consumption which results in effecting the release may be considerably smaller than that represented by the energy stored up in the spring 40 and by the extent of movement of the actuator 50, but it will be apparent that the extent of movement of the actuator 50 is a measure of some instantaneous value of energy consumption which existed during the interval of measurement for a substantial period of time.

The indicator may very advantageously be considered from another view point. When we consider this particular kind of demand indicator operating on a perfectly steady load the conditions are ideal and somewhat different from what occurs on a fluctuating load. Obviously, if the load were always steady the demand indicator would not be needed, and hence we are most particularly interested in the operation of the indicator on a fluctuating load. However, an explanation of the operation of the indicator on a steady load is helpful in determining and understanding the character of the operation on a fluctuating load. On a steady load the control spring 40 is wound up an amount which is not only a measure of the instantaneous value of the energy consumption in the translating devices 6 but an amount which also represents a measure of the total quantity of energy consumed in the translating devices during the interval of measurement. The extent of movement of the actuator 50 will in this case be a measure of the instantaneous value of the energy consumption during any instant of the interval and also a measure of the total amount of energy consumed in the transclating devices and integrated by the meter during the entire interval. The load to be metered is, however, scarcely ever a constant one, but it is very convenient and reasonably accurate to consider that the pointer 51 indicates the average load for the interval over which the energy consumption was greatest, and to consider the sector disk portion of the device as simply a means for restoring the elements of the indicator to their respective initial or zero positions at intervals, fairly constant in time because on steady load any deflection is accomplished in equal time. As heretofore explained the release of the actuator return mechanism can be effected by the sector disk 35 in two ways,—first, on steady load the spring 40 can be wound up until the torque produced by that load and acting on the sector disk is overbalanced, and second, the spring can be wound up a certain amount and then the energy consumption diminished, thereby reducing the torque acting upon the sector disk an amount sufficient to effect the release. In the second case the extent of movement of the actuator 50 may not be a very accurate measure of the instantaneous value of the energy consumption which effected the release. On the other hand the extent of movement of the actuator is a measure of the energy consumed during the interval. It will thus be seen that the movement of the actuator 50 is substantially a measure of the average rate at which energy was consumed during the interval and the release is accomplished by an instantaneous value of the energy consumption which is ordinarily approximately near this average value but not exactly like it.

It will be observed from the foregoing description and explanation that I have provided a maximum demand indicator of simple and compact construction. All of the operative elements of the indicator are always directly connected with their co-operating elements and there is no interrupting of gear connections to permit the return of the actuator to its initial position. The movement of the actuator in a backward direction to its initial position is smooth and gradual due to the retarding action of the damping vane 25 and decreasing gear train connecting the gear member 12 to the damping vane. The operative elements of the demand indicator are not numerous and are very compactly arranged, so that all of these elements can be easily included within an ordinary meter casing. As will be observed from the drawings, the sector disk 45 occupies very little additional space in the watthour meter, and can be included in an ordinary watthour meter of the induction type without difficulty.

Numerous modifications in the details of construction of my improved demand indicator will be evident to those skilled in the art. I do not, therefore, desire to be limited to the specific construction which I have herein illustrated and described by way of example, but I aim in the term of the appended claims to cover all modifications within the spirit and scope of my invention.

What I claim as new and desire to secure by Letters Patent of the United States, is:—

1. In a demand indicator, a rotatable meter element, a rotatably mounted member, means for exerting a torque on said member substantially proportional to the speed of rotation of the meter element, means adapted when energized to exert a countertorque on said member, and means whereby said last mentioned means is energized by the rotation of the meter element.

2. In a demand indicator, a rotatable meter element, a rotatably mounted shaft, means for exerting a torque on said shaft substantially proportional to the speed of rotation of the meter element, a spring adapted when energized to exert a countertorque on said shaft, and means whereby said spring is energized by the rotation of the meter element.

3. In a demand indicator, an electric meter having field coils and a rotatable armature, a member pivotally mounted in the 1,138,786 magnetic field of said coils whereby the member is subjected to a torque, means operatively related to said member and adapted when energized to exert a countertorque thereon, and means whereby said last mentioned means is energized by the rotation of said armature.

4. In a demand indicator, a rotatable meter element, a member having a restricted movement, means whereby a force is exerted on said member substantially proportional to the speed of rotation of the meter element, means adapted when energized to exert an opposing force on said member, and means whereby said last mentioned means is energized by the rotation of the meter element.

5. A maximum demand indicator comprising a rotatable meter shaft, an actuator having an initial position and operatively connected to the meter shaft, means adapted to be energized by the rotation of the meter shaft, means whereby the actuator is returned to its initial position when the meter shaft has energized said last mentioned means an amount substantially proportional to the speed of rotation of the meter shaft, and means for indicating the maximum movement of said actuator.

6. A maximum demand indicator comprising a rotatable meter element, an actuator having an initial position and adapted to be driven by said element, a movable member adapted to be acted upon by an electrical torque substantially proportional to the torque acting upon said element, a control spring operatively connected to said member and adapted to be energized by the rotation of said element, means whereby said actuator is returned to its initial position when the torque of said spring slightly exceeds the electrical torque acting upon said member, and means for indicating the maximum movement of said actuator.

7. A maximum demand indicator comprising a rotatable meter element, an actuator having an initial position and operatively connected to the meter element, a movably mounted member, means for exerting a force on said member substantially proportional to the speed of rotation of the meter element, means adapted when energized to exert an opposing force on said member, means whereby said last mentioned means is energized by the rotation of the meter element, and means whereby said actuator is returned to its initial position when the opposing force exerted on said member is slightly in excess of the first mentioned force, and means for indicating the maximum movement of said actuator.

8. A maximum demand indicator comprising a rotatable meter element, an actuator having an initial position and operatively connected to the meter element, a pivoted shaft having a restricted movement, means for exerting a torque on said shaft substantially proportional to the instantaneous speed of rotation of the meter element, means adapted when energized to exert a countertorque on said shaft, means whereby said last mentioned means is energized by the rotation of the meter element, means whereby said actuator is returned to its initial position when the countertorque exerted on said shaft overcomes the torque, and means for indicating the maximum movement of said actuator.

9. A maximum demand indicator comprising a rotatable meter element, an actuator having an initial position and adapted to be driven by said element, a movable member adapted to be acted upon by an electrical torque substantially proportional to the torque acting upon said element, a control spring operatively connected to said member and adapted to be energized by the rotation of said element, means whereby said actuator is returned to its initial position when the torque of said spring slightly exceeds the electrical torque acting upon said member, means for damping the movement of the actuator while it is returning to its initial position, and means for indicating the maximum movement of said actuator.

10. A maximum demand indicator comprising an electric meter having field coils and a rotatable armature, a member pivotally mounted in the magnetic field of said coils whereby the member is subjected to a torque, means operatively related to said member and adapted when energized to exert a countertorque thereon, means whereby said last mentioned means is energized by the rotation of said armature, an actuator having an initial position and operatively connected to said armature, means whereby said actuator is returned to its initial position when said countertorque overcomes said torque, and means for indicating the maximum movement of said actuator.

11. A maximum demand indicator comprising an electric meter having field coils and a rotatable armature, a member pivotally mounted in the magnetic field of said coils whereby the member is subjected to a torque, means restricting the movement of said member, a spring operatively related to said member and adapted when energized to exert a countertorque thereon, means whereby said spring is energized by the rotation of said armature, an actuator having an initial position and operatively connected to said armature, means whereby said actuator is returned to its initial position when said countertorque overcomes said torque, and means for indicating the maximum movement of said actuator.

12. A maximum demand indicator comprising an electric meter having field coils and a rotatable armature, a member pivotally mounted in the magnetic field of said coils whereby the member is subjected to a torque, a spring operatively related to said member and adapted when energized to exert a countertorque thereon, a differential gearing having two gear members and a planetary member, an actuator having an initial position and operatively connected to said planetary member, means operatively connecting said armature to one of said gear members, a spring connected to the second gear member and adapted when energized to return the actuator to its initial position, means whereby both of said springs are energized by the rotation of said armature, locking means for preventing rotation of said second gear member, means for releasing said locking means when the countertorque exerted on said member overcomes the torque, and means for indicating the maximum movement of said actuator.

In witness whereof, I have hereunto set my hand this 29th day of June, 1914.

WILLARD E. PORTER.

Witnesses:
 JOHN A. MCMANUS, Jr.,
 SVEN R. BERGMAN.